United States Patent [19]
Hata et al.

[11] Patent Number: 5,727,886
[45] Date of Patent: Mar. 17, 1998

[54] BEARING DEVICE FOR AXLE

[75] Inventors: Kazushige Hata, Yamatokoriyama; Yoshiaki Nagasawa, Kashiwara, both of Japan

[73] Assignee: Koyo Seiko Co., Ltd., Japan

[21] Appl. No.: 825,354

[22] Filed: Mar. 28, 1997

[30] Foreign Application Priority Data

May 27, 1996 [JP] Japan ................................. 8-154998

[51] Int. Cl.$^6$ .................................................. F16C 19/08
[52] U.S. Cl. ........................ 384/537; 384/540; 384/544; 384/585
[58] Field of Search ............................ 384/537, 540, 384/544, 585, 589

[56] References Cited

U.S. PATENT DOCUMENTS

| 3,380,766 | 4/1968 | Meibuhr | 384/540 |
| 5,490,732 | 2/1996 | Hofmann et al. | 384/537 |
| 5,505,547 | 4/1996 | Kodaira | 384/585 |
| 5,536,075 | 7/1996 | Bertetti | 384/585 |

*Primary Examiner*—Lenard A. Footland
*Attorney, Agent, or Firm*—Adams & Wilks

[57] ABSTRACT

A bearing device for an axle comprising an outer ring member, an inner ring member arranged coaxial with the outer ring member and relatively rotatably through a roller, and a rotational shaft member having the inner ring member integrally connected to at least a shaft end side portion by means of a nut engaged with a shaft end portion and being secured to the axle side at a counter shaft end side portion, comprising a locking means for enlarging a first thin-wall tubular portion formed in the shaft end portion of the rotational member and a second thin-wall tubular portion formed on the nut threadedly fitted in the shaft end portion of the rotational member outwardly in a diametrical direction to deform the first and second thin-wall tubular portions outwardly in a diametrical direction to thereby prevent looseness of the nut.

13 Claims, 3 Drawing Sheets

BEARING DEVICE FOR AXLE

FILED OF THE INVENTION

The present invention relates to a bearing device for an axle which requires no notched groove processing of a shaft end of a rotational shaft member and which is easy in caulking work for a nut for locking.

BACKGROUND OF THE INVENTION

A conventional bearing device for an axle so far known is shown in FIG. 3. This bearing device comprises an outer ring member 30 fixed on the vehicle body side, an inner ring member 31 arranged coaxially with the outer ring member 30 and relatively rotatable through a roller 33, a rotational shaft member 32 having the inner ring member 31 integrally connected to a shaft end side portion 32a and being connected to the axle side at a counter shaft end side portion 32b, the roller 33 arranged between the outer ring member, the inner ring member and the rotational shaft member to support them relatively rotatable, a cage 37 for holding the roller 33, and a seal member 38 for sealing between the outer ring member 30 and the inner ring member 31. The inner ring member 31 is integrally secured to the shaft end side portion 32a of the rotational shaft member 32 by means of a nut 34. This nut 34 is engaged with a threaded portion 34a formed in a shaft end portion 32c of the rotational shaft member 32. A protrusion 35 protruded from the nut 34 is bended inwardly of a single notched groove 36 provided at a position in a predetermined diametrical direction of the threaded portion 34a to provide stopping or locking of the nut 34 relative to the shaft end portion 32c.

However, in the conventional bearing device for an axle as described above, since the notched groove 36 is formed in the threaded portion 34a of the shaft end portion 32c of the rotational shaft member 32, it is necessary to remove burrs generated after the groove is processed, thus posing a problem in that the number of processing steps increases. Further, it is necessary to deepen the notched groove 36 to increase a bending amount of the protrusion 35 of the nut 34 in order to increase the locking force of the nut 34. In such a case as described above, the bended portion of the nut 34 tends to be cut, thus requiring to pay great attention to caulking work. This poses a problem in that when a plurality of bent portions are provided to increase the locking force, the number of processing steps of the notched groove 36 increases. Furthermore, registration between the notched groove 36 of the shaft end portion 32c and a jig for caulking and bending the protrusion 35 of the nut 34 is necessary so that a separate registering mechanism is necessary.

SUMMARY OF THE INVENTION

An object of the present invention is to provide a bearing device for an axle which requires no notched groove processing of a shaft end of a rotational shaft member and which is easy in caulking work for a nut for locking.

The bearing device for an axle according to the present invention comprises in configuration an outer ring member fixed on the vehicle body side; an inner ring member arranged coaxial with the outer ring member and relatively rotatably through a roller; a rotational shaft member having the inner ring member integrally connected to at least a shaft end side portion by means of a nut engaged with a shaft end portion and being secured to the axle side at a counter shaft end side portion; a first thin-wall tubular portion formed on the shaft end portion of said rotational member; a second thin-wall tubular portion formed on the nut engaged with the shaft end portion of said rotational shaft member, said second thin-wall portion being fitted in an outer peripheral surface of said first thin-wall tubular portion; and a locking means for enlarging at least one part of the circumference of said first thin-wall tubular portion outwardly in a diametrical direction to deform the first and second thin wall portions outwardly in a diametrical direction to provide locking of the nut.

In the bearing device for an axle according to the present invention, the thin-wall tubular portion of the shaft end portion of the rotational shaft is merely enlarged outwardly in a diametrical direction to simply enable blocking of the nut, and registration between the caulking portion and the jig as in the conventional construction is unnecessary, considerably reducing the number of processing.

DESCRIPTION OF PREFERRED EMBODIMENTS

The detailed embodiment of the present invention will be described hereinafter with reference to the drawings.

Figure 1:
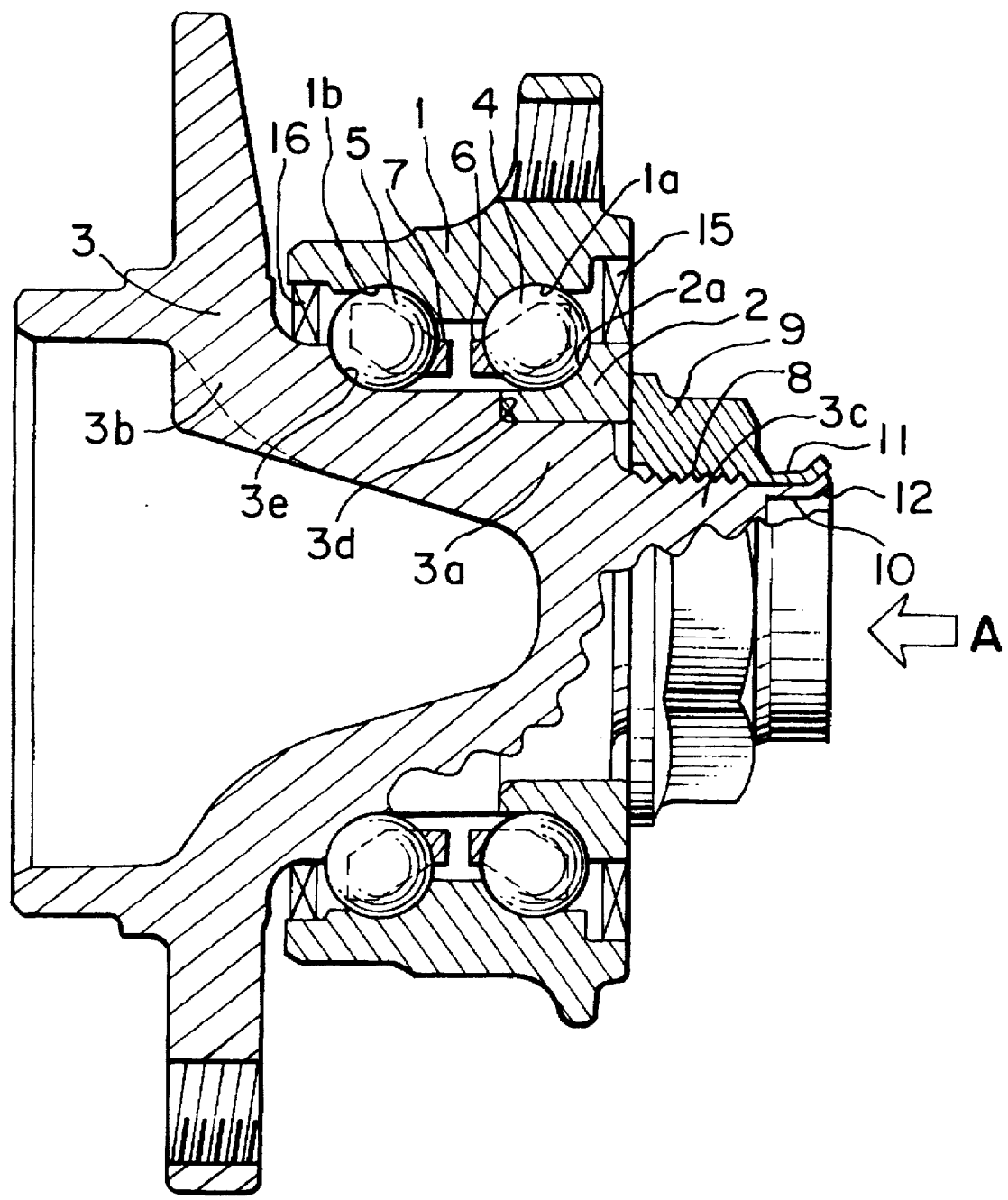
FIG. 1 is a longitudinal sectional view of a bearing device for an axle according to one embodiment of the present invention.

FIG. 1 is a longitudinal sectional view of a bearing device for an axle in the form of an embodiment according to the present invention.

An outer ring member 1 is secured to the vehicle body, not shown, and an inner ring member 2 is arranged coaxial with the outer ring member 1. A rotational shaft member 3 is secured on the wheel side, not shown at a counter shaft end side portion 3b, and a shaft end side portion 3a is formed with a shoulder 3d. The inner ring member 2 is pressed in and integrally connected to the shoulder 3d. Rollers 4 and 5 are arranged, so as to support the outer ring member 1, the inner ring member 2 and the rotational shaft member 3 relatively rotatably, between said members, and are held by cages 6 and 7. More specifically, a track 2a is formed in the outer peripheral surface of the inner ring member 2, and a track 1a is formed in the inner peripheral surface of one end of the outer ring member 1 so as to oppose to the track 2a. The roller 4 is rotatably arranged between the track 2a and the track 1a. Further, a track 3e is formed in the counter shaft end side portion 3b of the rotational shaft member 3, and a track 1b is formed in the inner peripheral surface of the other end of the outer ring member 1. The roller 5 is rotatably arranged between the track 3e and the track 1b. In this manner, the outer ring member 1, the inner ring member 2 and the rotational shaft member 3 can be rotated relatively one another through the rollers 4 and 5. While the track 3e is directly formed in the counter shaft end side portion 3b of the rotational shaft 3, it is to be noted that a separate inner ring member similar to the inner ring member 2 may be pressed and fixed as necessary to arrange the roller 5.

Figure 2:
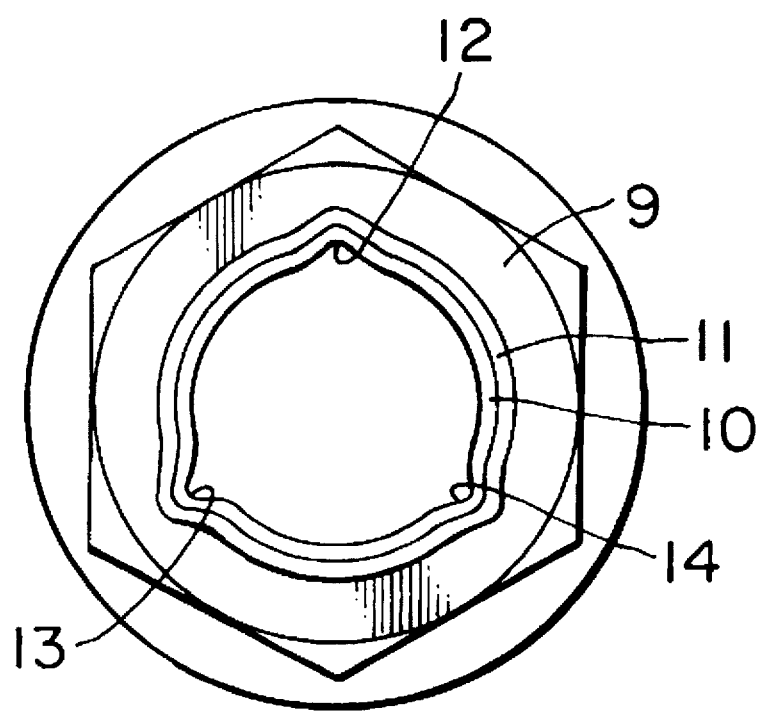
FIG. 2 is a partial sectional view of an inner ring member fixing portion as viewed at A FIG. 1.
Figure 3:
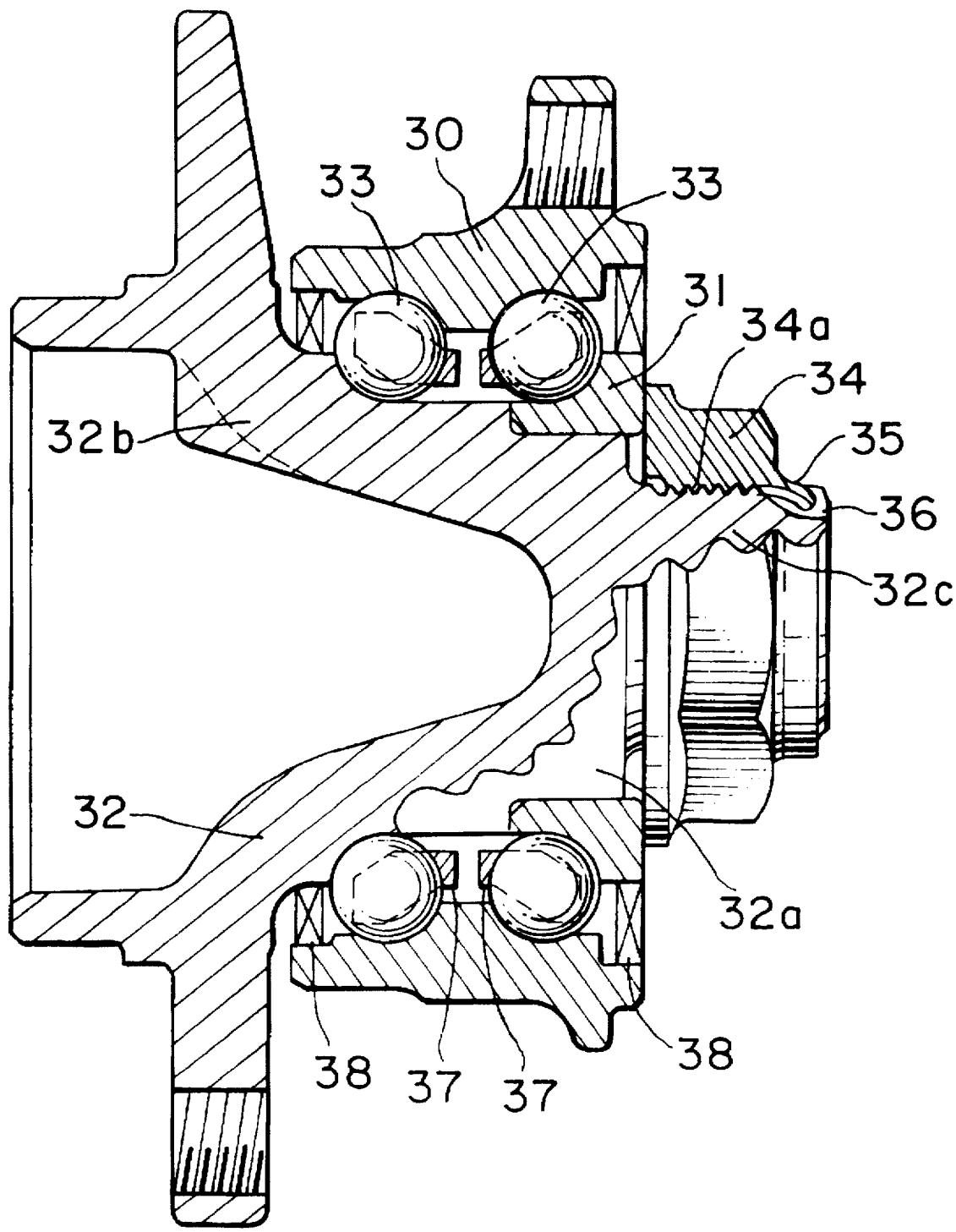
FIG. 3 is a longitudinal sectional view of a conventional bearing device for an axle.

A connecting member such as a threaded portion 8 is formed in a shaft end portion 3c of the rotational shaft member 3. A nut 9, is engaged with the threaded portion 8. This nut 9 presses the inner ring member 2 to apply internal pilot pressure to the bearing and prevents the inner ring member 2 from slipping out. A first thin-wall tubular portion 10 is projected in a shaft end direction on the shaft end portion 3c. A second thin-wall tubular portion 11 is projected at an extreme end of the inner peripheral surface of the nut 9, and is fitted in the outer peripheral surface of the first thin-wall tubular portion 10. As shown in FIG. 2, enlarging portions or protrusions 12, 13 and 14 are formed which are enlarged in three parts outwardly in a diametrical direction on the circumference of the first thin-wall tubular portion 10 to deform the first and second thin-wall tubular portions 10 and 11 outwardly in a diametrical direction. Loosening of the nut 9 is prevented by the enlarging portions 12, 13 and 14 which, therefore, constitutes locking means for locking the nut. Since the enlarging portions 12, 13 and 14 are formed at equi-distantly in the circumference, the stability during caulking is easily maintained. However, one or more enlarging portions may be provided as necessary.

Seal members are arranged between the outer ring member 1 and the inner ring member 2, and between the outer ring member 1 and the counter end shaft side portion 3b of the rotational member 3, respectively, to completely seal the bearing portion from both sides thereof.

In a modified embodiment, it is to be noted that locking of the nut 9 may be provided by a constricted portion in which three parts are constricted inwardly in a diametrical direction on the circumference of the first thin-wall tubular portion 10 to caulk and deform the first and second thin-wall tubular portions 10 and 11 outwardly in a diametrical direction.

What is claimed is:

1. A bearing device for an axle, comprising:
an outer ring member; an inner ring member arranged coaxial with the outer ring member and relatively rotatable therewith through a roller; a rotational shaft member having a shaft end side portion, a shaft end portion, and a counter shaft end side portion for connection to an axle; a nut engaged with the shaft end portion of the rotational shaft member for connecting the inner ring member to at least the shaft end side portion of the rotational shaft member; a first thin-wall tubular element integral with the shaft end portion of the rotational shaft member and having a peripheral surface; a second thin-wall tubular element integral with the nut and having a peripheral surface, the second thin-wall tubular element being disposed on the peripheral surface of the first thin-wall tubular element; and locking means including at least one protrusion extending radially outward from the peripheral surface of each of the first and second thin-wall tubular elements for locking the nut to the shaft end portion of the rotational shaft member.

2. A bearing device as claimed in claim 1; wherein the first thin-wall tubular element and the shaft end portion of the rotational shaft member are formed of a single piece of material; and wherein the second thin-wall tubular element and the nut are formed of a single piece of material.

3. A bearing device as claimed in claim 1; wherein the protrusion extending from the peripheral surface of the second thin-wall tubular element is disposed on the protrusion extending from the peripheral surface of the first thin-wall tubular element.

4. A bearing device as claimed in claim 1; wherein the locking means comprises a plurality of protrusions extending radially outward from the peripheral surface of each of the first and second thin-wall tubular elements for locking the nut to the shaft end portion of the rotational shaft member.

5. A bearing device as claimed in claim 4; wherein the protrusions are disposed equidistantly along the peripheral surface of the first and second thin-wall tubular elements.

6. A bearing device as claimed in claim 5; wherein each protrusion extending from the peripheral surface of the second thin-wall tubular element is disposed on one of the protrusions extending from the peripheral surface of the first thin-wall tubular element.

7. A bearing device as claimed in claim 4; wherein the first thin-wall tubular element and the shaft end portion of the rotational shaft member are formed of a single piece of material; and wherein the second thin-wall tubular element and the nut are formed of a single piece of material.

8. A bearing device comprising:
a first ring member; a second ring member disposed coaxial to the first ring member for relative rotation therewith; a shaft member mounted for rotation relative to the first ring member and having a side portion and an end portion; a connecting member disposed over the end portion of the shaft member for integrally connecting the second ring member to at least the side portion of the shaft member; a first tubular wall integral with the end portion of the shaft member, the first tubular wall having at least one protrusion extending radially outward from a peripheral surface thereof; and a second tubular wall integral with the connecting member, the second tubular wall having at least one protrusion extending radially outward from a peripheral surface thereof, and the protrusion of the second tubular wall being disposed over and aligned with the protrusion of the first tubular wall for locking the connecting member to the end portion of the shaft member.

9. A bearing device according to claim 8; wherein each of the first tubular wall and the second tubular wall has a plurality of protrusions extending radially outward from the peripheral surface thereof, each protrusion of the second tubular wall being disposed over and aligned with one of the protrusions of the first tubular wall.

10. A bearing device as claimed in claim 9; wherein the protrusions of each of the first tubular wall and the second tubular wall are disposed equidistantly along the peripheral surface thereof.

11. A bearing device for an axle, comprising:
a first ring member; a rotational shaft member having a first end for connection to an axle for rotation relative to the first ring member about a central axis, and a second end terminating in a first thin-wall tubular portion coaxial with the central axis, the first thin-wall tubular portion having at least one protrusion extending radially outward from a peripheral surface thereof; a second ring member integrally connected to the rotational shaft member; and a connecting member for integrally connecting the second ring member to the rotational shaft member, the connecting member having a second thin-wall tubular portion coaxial with the central axis, the second thin-wall tubular portion having at least one protrusion disposed over the protrusion of the first thin-wall tubular portion for locking the connecting member to the shaft end portion of the rotational shaft member.

12. A bearing device for an axle as claimed in claim 11; wherein each of the first thin-wall tubular portion and the second thin-wall tubular portion has a plurality of protrusions extending radially outward from the peripheral surface thereof, each protrusion of the second thin-wall tubular portion being disposed over and aligned with one of the protrusions of the first thin-wall tubular portion for locking the connecting member to the shaft end portion of the rotational shaft member.

13. A bearing device as claimed in claim 12; wherein the protrusions of each of the first thin-wall tubular portion and the second thin-wall tubular portion are disposed equidistantly along the peripheral surface thereof.

* * * * *